(12) United States Patent
Ciotirca et al.

(10) Patent No.: US 11,520,439 B1
(45) Date of Patent: Dec. 6, 2022

(54) SELF-ADAPTIVE ULTRA-SONIC TOUCH SENSOR

(71) Applicant: Infineon Technologies AG, Neubiberg (DE)

(72) Inventors: Lavinia-Elena Ciotirca, Bucharest (RO); Mihai-Liviu Tudose, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/487,325

(22) Filed: Sep. 28, 2021

(51) Int. Cl.
  *G06F 3/041* (2006.01)
  *G06F 3/043* (2006.01)
  *G01S 15/88* (2006.01)
  *G01S 15/12* (2006.01)

(52) U.S. Cl.
  CPC ............ *G06F 3/0436* (2013.01); *G01S 15/12* (2013.01); *G01S 15/88* (2013.01); *G06F 3/0418* (2013.01)

(58) Field of Classification Search
  CPC ...... G06F 3/0436; G06F 3/0418; G01S 15/12; G01S 15/88; A61B 8/485; A61B 8/10; A61B 8/488; A61B 8/5223; A61B 8/5292; A61B 3/165; A61B 2503/40; B06B 1/0207; B06B 1/0292; B06B 1/0644; G16H 50/30
  See application file for complete search history.

(56) References Cited

U.S. PATENT DOCUMENTS

| | | | |
|---|---|---|---|
| 11,392,250 B1* | 7/2022 | Khajeh | G06F 3/0436 |
| 2016/0018948 A1* | 1/2016 | Parvarandeh | G06F 1/163 |
| | | | 345/175 |
| 2018/0341359 A1* | 11/2018 | Khajeh | G06F 3/03545 |
| 2019/0354238 A1 | 11/2019 | Akhbari et al. | |
| 2021/0117035 A1 | 4/2021 | Kim et al. | |

FOREIGN PATENT DOCUMENTS

| | | |
|---|---|---|
| WO | 2009016606 A2 | 2/2009 |
| WO | 2012014010 A1 | 2/2012 |

* cited by examiner

*Primary Examiner* — Md Saiful A Siddiqui
(74) *Attorney, Agent, or Firm* — Harrity & Harrity, LLP

(57) ABSTRACT

A method of configuring a touch sensor includes transmitting an ultra-sonic test signal induced by a first excitation signal towards a touch structure that has a first interface with an enclosed interior volume of the touch sensor and a second interface with an external environment; receiving a plurality of ultra-sonic reflected signals produced from the ultra-sonic test signal and the touch structure, including a first ultra-sonic reflected signal internally reflected by the first interface and a last ultra-sonic reflected signal internally reflected by the second interface; determining a last time of flight corresponding to the last ultra-sonic reflected signal; and selectively configuring a second excitation signal based on the last time of flight. The second excitation signal is used for inducing further ultra-sonic signals.

24 Claims, 3 Drawing Sheets

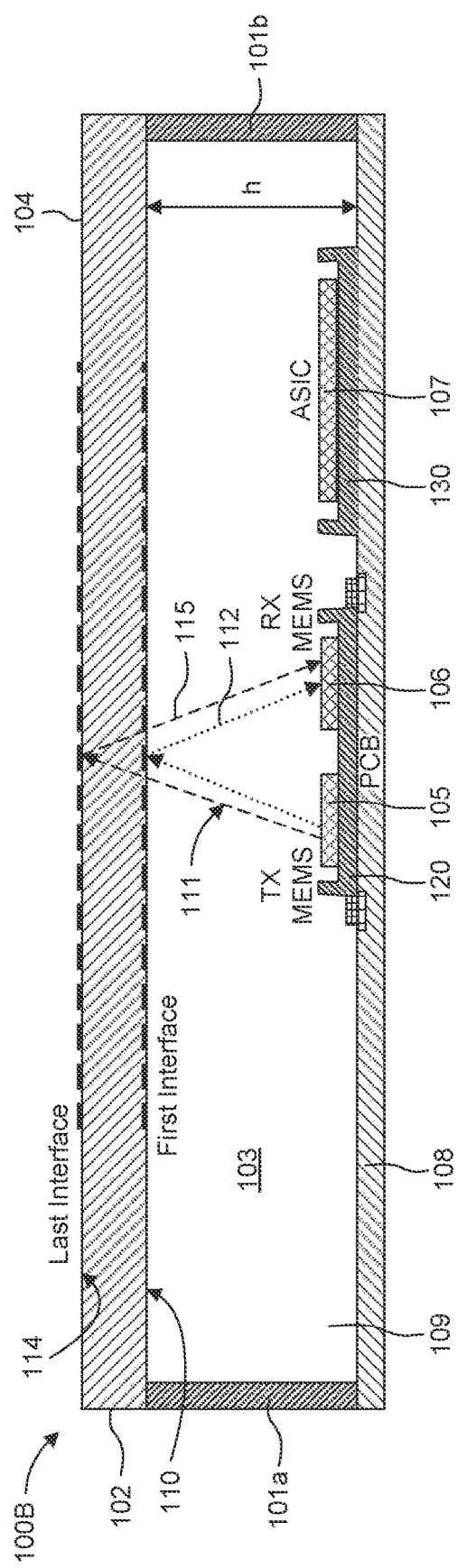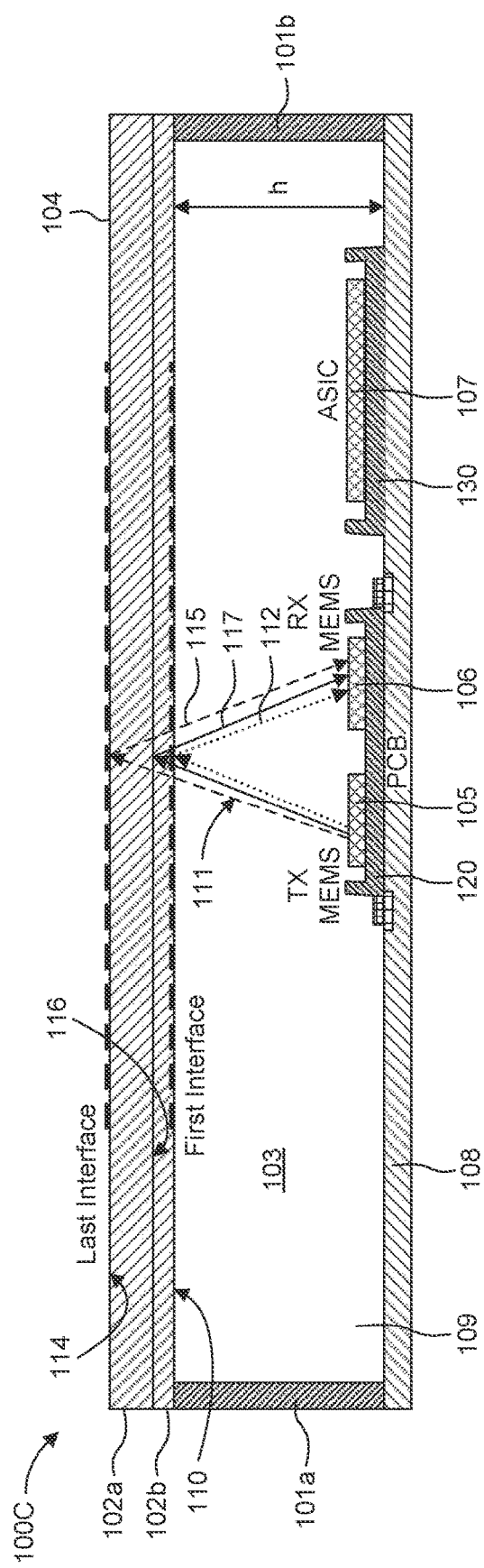

SELF-ADAPTIVE ULTRA-SONIC TOUCH SENSOR

BACKGROUND

Touch sensing through metal surfaces using ultra-sonic waves is currently being investigated as an alternative to capacitive touch sensing principles. Ultra-sonic sensing relies on the transmission of an ultra-sonic signal and the reception and processing of the reflected waveform from the touch surface of a touch substrate. The waveform will depend on the existence or non-existence of a touch event. However, there are many types of touch substrate used across manufactures, the materials of which have different acoustic properties. The acoustic property of the touch substrate can affect the reliability of the sensing, including the detection of a touch or no-touch event (with or without surface contamination) and the location and applied force of a touch event, should one occur. Thus, an ultra-sonic touch sensor should be calibrated for the type of touch surface used in order for successful, accurate, and robust sensing and measurement acquisition. Accordingly, an ultra-sonic touch sensor that can provide robust and reliable touch detection regardless of the type of touch surface used may be desirable.

SUMMARY

One or more embodiments provide a touch sensor, including: a housing having a recess; a touch structure coupled to the housing and arranged over the recess such that the recess forms an enclosed interior volume, wherein the touch structure includes a touch surface and an inner surface arranged opposite to the touch surface, wherein the inner surface faces towards the enclosed interior volume and forms a first interface between the touch structure and the enclosed interior volume, and wherein the touch surface forms a second interface between the touch structure and an external environment; a signal generator configured to generate a first excitation signal during a configuration mode and generate a second excitation signal during a touch detection operation mode; a transmitter arranged inside the enclosed interior volume, wherein the transmitter is configured to generate an ultra-sonic test signal based on the first excitation signal and an ultra-sonic touch evaluation signal based on second excitation signal; a receiver arranged inside the enclosed interior volume and coupled to the transmitter via a propagation path, wherein the receiver is configured to receive a plurality of ultra-sonic reflected signals produced from the ultra-sonic test signal and the propagation path, including a first ultra-sonic reflected signal internally reflected by the first interface and a last ultra-sonic reflected signal internally reflected by the second interface; and a sensor circuit arranged inside the enclosed interior volume and configured to determine a last time of flight corresponding to the last ultra-sonic reflected signal and selectively configure the second excitation signal based on the last time of flight.

One or more embodiments provide a touch sensor, including: a housing having a recess; a touch structure coupled to the housing and arranged over the recess such that the recess forms an enclosed interior volume, wherein the touch structure includes a touch surface and an inner surface arranged opposite to the touch surface, wherein the inner surface faces towards the enclosed interior volume and forms a first interface between the touch structure and the enclosed interior volume, and wherein the touch surface forms a second interface between the touch structure and an external environment; a signal generator configured to generate a first excitation signal during a configuration mode and generate a second excitation signal during a touch detection operation mode; a transmitter arranged inside the enclosed interior volume, wherein the transmitter is configured to generate an ultra-sonic test signal based on the first excitation signal and an ultra-sonic touch evaluation signal based on second excitation signal; a receiver arranged inside the enclosed interior volume and coupled to the transmitter via the touch structure, wherein the receiver is configured to receive a plurality of ultra-sonic reflected signals produced from the ultra-sonic test signal and the touch structure, including a first ultra-sonic reflected signal internally reflected by the first interface and a last ultra-sonic reflected signal internally reflected by the second interface; and a sensor circuit arranged inside the enclosed interior volume, wherein while operating in the touch detection operation mode, the sensor circuit is configured to use a touch detection algorithm to determine whether a no-touch event or a touch event has occurred at the touch surface, and wherein while operating in the configuration mode, the sensor circuit is configured to determine a last time of flight corresponding to the last ultra-sonic reflected signal and selectively configure the touch detection algorithm based on the last time of flight.

One or more embodiments provide a method of configuring a touch sensor. The method includes: transmitting an ultra-sonic test signal induced by a first excitation signal towards a touch structure that has a first interface with an enclosed interior volume of the touch sensor and a second interface with an external environment; receiving a plurality of ultra-sonic reflected signals produced from the ultra-sonic test signal and the touch structure, including a first ultra-sonic reflected signal internally reflected by the first interface and a last ultra-sonic reflected signal internally reflected by the second interface; determining a last time of flight corresponding to the last ultra-sonic reflected signal; and selectively configuring a second excitation signal based on the last time of flight, wherein the second excitation signal is used for inducing further ultra-sonic signals.

BRIEF DESCRIPTION OF THE DRAWINGS

Embodiments are described herein making reference to the appended drawings.

FIG. 1B illustrates an ultra-sonic touch sensor with a single-layered touch structure according to one or more embodiments;

FIG. 1C illustrates an ultra-sonic touch sensor with a multi-layered touch structure according to one or more embodiments.

DETAILED DESCRIPTION

Figure 1A:
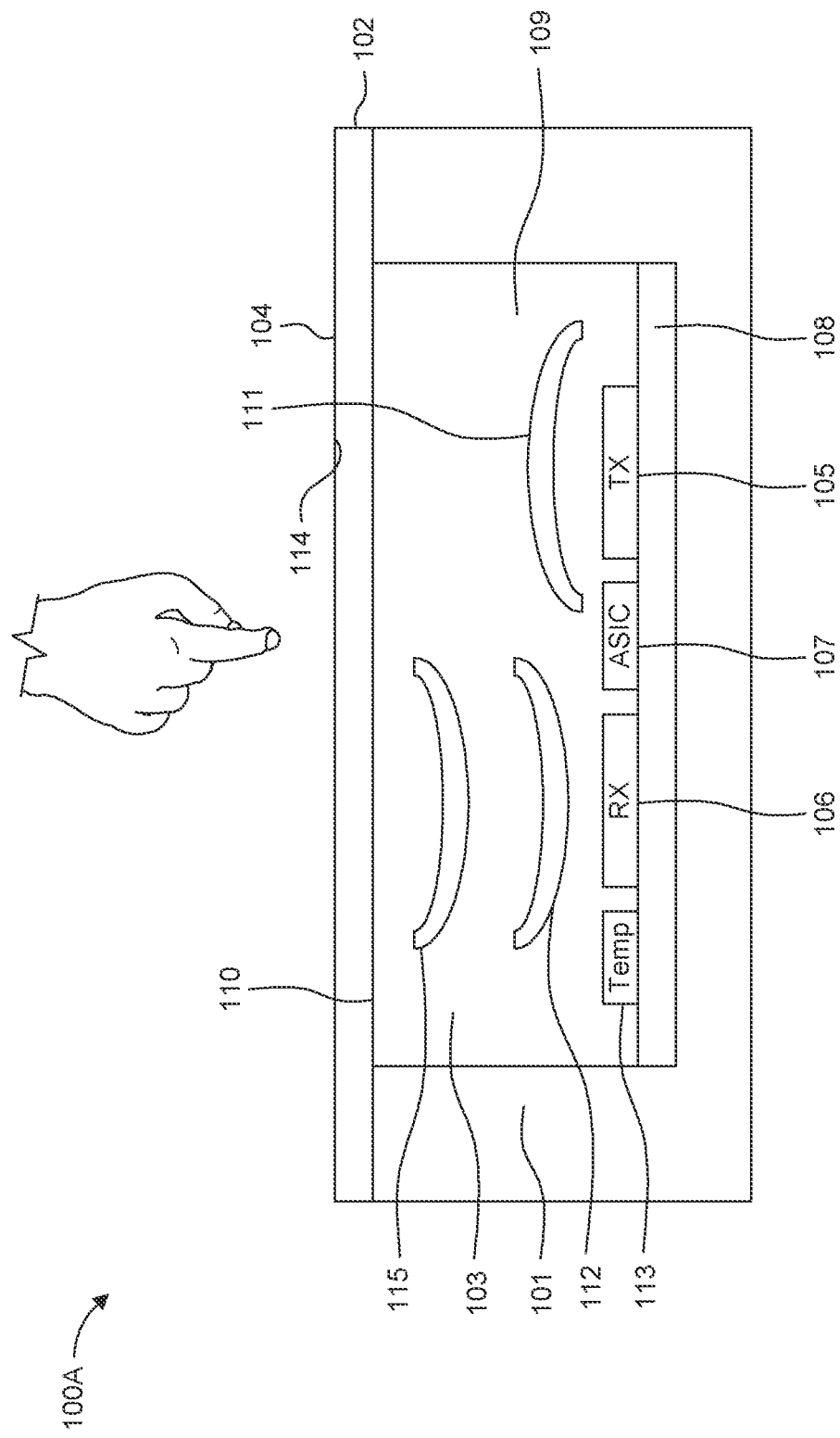
FIG. 1A illustrates an ultra-sonic touch sensor according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation. For example, lateral, vertical, and overlapping spatial or positional relationships may be described in reference to another element or feature, without being limited to a specific orientation of the device as a whole.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more elements of the present disclosure may be configured by implementing dedicated hardware or a software program on a memory controlling a processor to perform the functions of any of the components or combinations thereof. Any of these components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (i.e., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Embodiments relate to ultra-sonic (i.e., acoustic) touch sensors and ultra-sonic touch sensor systems. A sensor may refer to a component which converts a physical quantity to be measured to an electrical signal, for example a current signal or a voltage signal. In this case, the physical quantity is ultra-sonic sound waves produced, for example, a microelectromechanical system (MEMS) transducer.

In particular, embodiments are directed to the auto-adaptation of the excitation signal (i.e., the signal applied to the transmitter (TX) transducer to produce an ultrasonic wave) and/or the auto-adaption of the touch detection algorithm used by the sensor circuit (e.g., the signal measurement and processing circuit) to detect touch events and the location on the touch surface and the applied force thereof. Touch detection success using capacitive micromachined ultrasonic transducers (CMUTs) is highly dependent on the excitation method (the signal applied on the TX transducer to produce an ultrasonic wave) and on the method of post-processing the received signals (i.e., the touch detection algorithm).

The type of material or materials used for the touch substrate, and the acoustic properties thereof, can impact the propagation time of an ultra-sonic wave through the touch substrate. The type of material or materials used for the touch substrate can also affect the amount of ultra-sonic energy that is reflected at the touch substrate during a no-touch event and a touch event, thereby affecting the amplitude of a reflected signal during different touch/no-touch conditions. The thickness the material or materials used for the touch substrate can also affect the propagation time and amount of reflected ultra-sonic energy. Some types of excitation signals may be better suited than others for certain types of touch materials for producing more accurate and robust results. Likewise, certain touch detection algorithms may be better suited for one type of touch material than for others. Both the type of excitation signal and touch detection algorithm may be better suited for a certain thicknesses of the touch substrate than other thicknesses.

The auto-adaption is dependent on the type of material or materials used for the touch substrate and their thicknesses. In this way the excitation signal and/or the detection algorithm can be adapted automatically by the sensor circuit based on the measured acoustic properties of the touch substrate(s). This idea enables robust and accurate touch detection through multiple types of touch materials and thicknesses using one single sensor. In other words, the same sensor arrangement can be placed into different packages used across different manufactures and auto-calibrated to the touch material(s) used in the package. Moreover, the concept can be applied for touch materials with known acoustic properties as well as those with unknown acoustic properties. The proposed sensor is capable of discriminating the acoustic properties of all types of materials and thicknesses.

FIG. 1A illustrates an ultra-sonic touch sensor 100A according to one or more embodiments. As defined herein, an ultra-sonic signal is a sound wave having a frequency of 20 kHz or higher. Indeed, in FIG. 1A ultra-sonic signals 111, 112, and 115 are depicted as ultra-sonic sound waves. a single transmitted wave/signal 111 causes two reflections at different interfaces 110 and 114, with ultra-sonic sound wave 112 being a reflection from interface 110 and ultra-sonic sound wave 115 being a reflection from interface 114. Being that the interface 114 is more distant from the transmitter than interface 110, the ultra-sonic sound wave 115 occurs at a later time instance than the occurrence of ultra-sonic sound wave 112.

The ultra-sonic touch sensor 100A includes a housing comprising an encapsulant 101 (e.g., molding) and a touch structure 102 (e.g., a touch substrate) that forms an interior volume 103 with the encapsulant 101. In other words, as part of the housing, the encapsulant 101 has a recess that becomes the interior volume 103 when the touch structure 102 encloses the recess.

In particular, the touch structure 102 is used as a lid or a package cover that rests upon the sidewalls of the encapsulant 101. The interior volume 103 is a cavity that is formed by the enclosure of the encapsulant 102 and the touch structure 102. The touch structure 102 may be made of one or more metal layers and/or plastic layers and/or layers made out of other solid material and includes a touch surface 104 at its external interface with the environment. The touch surface 104 is arranged and operable to receive contact (i.e., touches) from a user that can be detected by sensor circuitry.

The interior volume 103 contains the circuitry used for detecting no-touch and touch events at the touch surface 104. A touch event is defined as an instance when a user makes contact with the touch surface 104 and a no-touch event is all other circumstances, including the occurrence of disturbing influences (i.e., error sources) that may occur in the absence of a touch event. The circuitry is configured to distinguish between a touch event and a no-touch event, taking into account possible errors originating from the disturbing influences.

The circuitry includes a transmitter (TX) 105 configured to transmit ultra-sound signals, a receiver (RX) 106 configured to receive reflected ultra-sound signals, and a sensor circuit 107 (e.g., an application specific integrated circuit (ASIC)) configured to generate the ultra-sound signals for transmission by the transmitter 105, perform signal processing on reflected ultra-sound signals received by the receiver 106, evaluate the reflected ultra-sound signals for detecting no-touch events and touch events by applying a touch detection algorithm, and control one or more components of the sensor 100A, including control of the transmitter 105, the receiver 106, or any of the signal processing components of the signal processing chain of the sensor circuit 107.

The transmitter 105 and the receiver 106 may both be sound transducers with a flexible membrane that vibrates to either produce sound waves, in the case of a transmitter, or in response to receiving sound waves, in the case of a receiver. In particular, the transmitter 105 and the receiver 106 may be capacitive micromachined ultrasonic transducer (CMUTs). A CMUT is a transducer where the energy transduction is due to change in capacitance. CMUTs are constructed on silicon using micromachining techniques. A cavity is formed in a silicon substrate, and a thin layer suspended on the top of the cavity serves as a membrane on which a metallized layer acts an electrode, together with the silicon substrate which serves as a bottom electrode.

If an AC signal is applied across the biased electrodes, the vibrating membrane will produce ultrasonic waves in the medium of interest. In this way, the CMUT works as a transmitter. The sensor circuit 107 is configured to generate an excitation signal and transmit the excitation signal to the transmitter 105. The excitation signal is applied across the biased electrodes, causing the membrane to vibrate according to the waveform of the excitation signal and producing a corresponding ultrasonic wave. Different excitation signals induce different ultrasonic waves. On the other hand, if ultrasonic waves are applied on the membrane of a biased CMUT, the membrane will vibrate according to the applied ultrasonic wave and the CMUT will generate alternating signal as its capacitance is varied. In this way, the alternating signal is representative of a received ultrasonic waves and the CMUT operates as a receiver of ultrasonic waves. As will be described in greater detail below, the sensor circuit 107 is configured with multiple types of excitation signals and multiple types of touch detection algorithms that can be selectively utilized depending on the measured acoustical properties of the propagation channel, which includes the touch structure 102.

The transmitter 105, the receiver 106, and the sensor circuit 107 may be arranged on common circuit substrate 108 (e.g., a PCB) that is disposed at the base of the encapsulant. The common circuit substrate 108 is configured to electrically couple the sensor circuit 107 to both the transmitter 105 and the receiver 106. The transmitter 105, the receiver 106, and the sensor circuit 107 may be separate ICs (i.e., dies) or may be combined in any combination into one or two ICs. Additionally, the both the transmitter 105 and the receiver 106 may be implemented at separate transceivers such that two transmitters and two receivers (i.e., one TX/RX pair per transceiver) are provided.

The remaining portion of the interior volume 103 is filled with a coupling medium 109, such as a silicone gel, soft epoxy, liquid, or any other material that enables the propagation of ultra-sonic signals with substantially no attenuation. The coupling medium 109 is a non-gaseous medium.

The coupling medium 109 is in contact with an inner (interior) surface 110 of the touch structure 102, the interface of which is configured to reflect transmitted ultra-sonic signals 111 back into the interior volume 103 to be received by the receiver 106 as reflected ultra-sonic signals 112. Thus, the transmitter 105 and the receiver 106 are coupled together by the coupling medium 109. The coupling medium 109 and the inner surface 110 form a propagation channel between the transmitter 105 and the receiver 106.

As noted above, the touch surface 104 forms an interface 114 with the environment. A second internal reflection of the transmitted ultra-sonic signal occurs at this interface 114, producing reflected ultra-sonic signal 115. Because length the propagation channel for signals 111 and 115 is longer than the propagation channel for signals 111 and 112, the time of flight (TOF) for signals 111 and 115 will be longer than the time of flight for signals 111 and 112. Moreover, the time of flight for signals 111 and 115 is further affected by the material(s) that make up the touch structure 102. Also, the amplitude of signals 112 and 115 is affected by the material(s) that make up the touch structure 102. Accordingly, the receiver 106 will receive two reflected signals 112 and 115 from a transmitted ultra-sonic signal at different times due to their difference in time of flight.

An acoustic wave propagation time through a certain material depends on the acoustic properties of that material, including sound velocity and density. By finding the propagation time through a material (e.g., the touch structure 102), the sensor circuit 107 can determine the acoustic property of the touch structure 102 and/or identify the material of the touch structure. The sensor circuit 107 is configured to determine the propagation time through the touch structure 102 by calculating a difference between the time of flight resultant from the first acoustical wave interface 110 (i.e., the first interface of incidence of the touch structure 102) and the time of flight resultant from the last acoustical wave interface 114 (i.e., the last interface of incidence of the touch structure 102).

Upon calculating the difference between the two time of flights, the sensor circuit is configured to select the excitation signal and/or the touch detection algorithm and exit a calibration mode to thereby enter into a normal operation mode (i.e., a touch detection operation mode) during which the selected excitation signal and/or the touch detection algorithm is/are used for detecting no touch and touch events. Thus, the sensor circuit 107 is configured to enter a configuration mode, for example, upon start up, select the excitation signal and/or the touch detection algorithm during configuration mode, and then enter a normal operation mode during which the selected the excitation signal and/or the touch detection algorithm is/are used.

It is noted, if the touch structure 102 is made up of multiple layers, one or more intermediary interfaces would exist between interfaces 110 and 114, with each intermediary interface producing its own internal reflected acoustic signal. In this case, the sensor circuit 107 is configured to detect the first (initial) reflected signal 112 corresponding to the transmitted signal 111 being reflected at interface 110, detect the last reflected signal 115 corresponding to the transmitted signal 111 being reflected at interface 114, and calculate the difference between the two time of flights (i.e., the first or shortest time of flight and the last or longest time of flight). The sensor circuit 107 may monitor for the first and last time of flights during an observation window, and, upon the expiration of the observation window, calculate the difference between the first and last time of flights detected during the observation window. The sensor circuit 107 is configured to detect the first reflected signal (i.e., a first echo) and a last reflected signal (i.e., a last echo) detected during the observation window for calculating the first and the last time of flights. In this case, the observation window should be long enough to ensure the last reflection is detected.

A touch event at the touch surface 104 of the touch structure 102 causes a change in a property of the propagation channel and thereby changes the propagation of the ultra-sonic signals through the propagation channel from the transmitter 105 to the receiver 106. In other words, a property of an ultra-sonic signal propagating along the propagation channel changes in response to a touch event at the touch surface 104 and the sensor circuit 107 is configured to detect the touch event, including one or more characteristics thereof, including amount of contact pressure, a contact duration, and a contact location on the touch surface 104. In particular, during normal operation of the touch sensor 100A, the sensor circuit 107 is configured to apply the selected touch detection algorithm to distinguish between a touch event and a no-touch event, taking into account possible error sources such as electrical and ultra-sonic cross-talk, multipath propagation, noise, temperature, and environmental disturbances such as dirt or water on the touch surface 104.

During normal operation of the touch sensor 100A, the sensor circuit 107 is configured to generate an ultra-sonic transmit signal for each touch/no-touch decision by applying the selected excitation signal. Upon receipt of each reflected ultra-sonic signal, the sensor circuit 107 makes a touch/no-touch decision using the selected touch detection algorithm. The time between sub-sequent touch detections (i.e., between successive excitation signals) can be in the order of 25 us, for example. The period between triggering an excitation signal and a next excitation signal may be referred to as an excitation frame. The sensor circuit 107 is configured to analyze reflected signals for each excitation frame to make a touch/no touch decision on a frame-by-frame basis.

As one example, a touch detection algorithm may enable the sensor circuit 107 to calculate the received signal energy computed by a summation of absolute values or of squared values of a plurality of measurement samples acquired from the reflected signal. The sensor circuit 107 may then use the received signal energy to detect a touch event or a no touch event by comparing the received signal energy to a threshold value. As another example, a touch detection algorithm may enable the sensor circuit to calculate a cross-correlation between the reflected signal and a ROM copy of the transmitted signal, and detect a touch event or a no touch event based on the calculated cross-correlation. Here, the sensor circuit 107 may compare a plurality of measurement samples of the reflected signal to the ROM copy of the transmitted signal for determining the cross-correlation.

An excitation signal may be a short signal pulse or a pulse train comprised of multiple short pulses (e.g., having a duration of about 100 ns up to about 1 us). An excitation signal can have any shape (e.g., rectangular, sinusoid, Gaussian, a Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chips may have the same pulse duration or have different pulse durations.

Different types of excitation signals may be stored in memory accessible to the sensor circuit 107 with each excitation signal having a different set of signal parameters that define pulse shape, pulse duration, frequency modulation, number of pulses, pulse train duration, etc. Alternatively, different sets of parameters used to generate different excitation signals may be stored and a set of parameters may be selected for generating a corresponding excitation signal.

On the receiver side, the sensor circuit 107 includes an analog signal processing chain and a digital signal processing chain, both of which may include one or more optional components. The analog signal processing chain may include a direct down-converter and low-pass filter as optional components. The direct down-converter may include any form of direct down-conversion of the reflected ultra-sonic signals 112 and 115. For example, squaring, absolute value, rectification, and so on may be used for performing the direct down-conversion. Analog circuit blocks for such a down-conversion processing can be a multiplier or even just a diode. The low-pass filter cut-off frequency should be tuned to the bandwidth of the transmitted ultra-sonic signal and the bandwidth of the transmitter 105. For example, the low-pass filter cut-off frequency could be set 1 MHz or 2 MHz.

The sensor circuit 107 includes an analog-to-digital converter (ADC) that is configured to capture multiple digital samples (i.e., measurement samples) from the reflected ultra-sonic signals 112 and 115 for each ultra-sonic transmit signal and store the digital samples in memory. A digital processor is operable to evaluate the digital samples received in an observation window using the selected touch detection algorithm to determine whether there is a no-touch event or touch event corresponding to the ultra-sonic transmit signal. The observation window has a start time and an end time and may be different than the observation window used to capture samples during configuration mode for selectively configuring the excitation signal and/or the touch detection algorithm.

The start time for the storing of digital samples depends on the time the ultra-sonic transmit signal is transmitted by the transmitter 105 and the time-of-flight of the first reflection in the system. The time-of-flight of the first reflection is a predetermined time it takes for the ultra-sonic transmit signal to travel from the transmitter 105, to the inner surface 110, and back to the receiver 106. The distance traveled and the speed of travel of the ultra-sonic signal are known parameters. The time-of-flight may also be affected by type of material used for the inner surface 110 (e.g., the material of the touch substrate 102) and the coupling medium 109. The time-of-flight may also be affected by temperature. A temperature sensor 113 may be used inside the interior volume 103 to measure the temperature and provide the temperature measurement to the sensor circuit 107 for calculating the time-of-flight. In any case, the time-of-flight is known by the sensor circuit 107 at the time the ultra-sonic transmit signal 111 is transmitted by the transmitter 105.

The observation window of reflected ultra-sonic signal will start at the expected time-of-flight of the first reflection plus the duration of the signal pulse. Any signals received prior to the start time (e.g., between the transmission time and the transmission time plus the time-of-flight) do not carry information about the touch event and can be disregarded and/or not stored.

The observation window duration can be preconfigured. For example, 10 us or 20 us are possible observation window durations. The longer the observation window, may result in a more robust the touch/no-touch decision. However, a longer observation window generally has a longer processing time, requires more memory, more silicon die size and energy consumption and/or requires a longer time between transmitted ultra-sonic signals, making the refresh rate of the system slower. The stored and windowed digital samples are fed to the selected touch detection algorithm used by a digital processor for making the touch/no-touch decision.

FIG. 1B illustrates an ultra-sonic touch sensor 100B with a single-layered touch structure according to one or more embodiments. The ultra-sonic touch sensor 100B is similar to ultra-sonic touch sensor 100A except sidewalls 101a and 101b of the package extend between the common circuit substrate 108, which forms a base structure. The cavity 103 is defined by the sidewalls, the base structure, and the touch structure 102. Furthermore, the transmitter 105 and the receiver 106 are depicted as being integrated on one package 120 that is electrically connected to the common circuit substrate 108 and the sensor circuit (ASIC) 107 is integrated on another package 130 that is electrically connected to the common circuit substrate 108 and to the transmitter 105 and the receiver 106 via the common circuit substrate 108. FIG. 1A illustrates an ultra-sonic touch sensor according to one or more embodiments.

FIG. 1B illustrates the principle of two internal reflections of the transmitted ultra-sonic signal 111 at interfaces 110 and 114 to produce reflected ultra-sonic signals 112 and 115, respectively. Reflected ultra-sonic signal 112 will be the first reflected signal received by receiver 106 and reflected ultra-sonic signal 115 will be the second or last reflected signal received by receiver 106 with respect to the same transmitted pulse.

During calibration mode, the sensor circuit 107 generates an excitation signal as a single electrical pulse to produce an ultra-sonic pulse as the transmitted ultra-sonic signal 111, detects the first reflected ultra-sonic signal 112 received at the receiver 106 with respect to the transmitted pulse and calculates its time of flight, detects the last reflected ultra-sonic signal 115 received at the receiver 106 with respect to the transmitted pulse and calculates its time of flight, calculates the difference between the two time of flights, and selects an excitation signal and/or a touch detection algorithm based on the calculated difference for use in normal operation mode.

FIG. 1C illustrates an ultra-sonic touch sensor 100C with a multi-layered touch structure according to one or more embodiments. The ultra-sonic touch sensor 100C is similar to ultra-sonic touch sensor 100B except the touch structure is formed by multiple layers 102a and 102b. As a result, an additional interface 116 is present between the two layers 102a and 102b of the touch structure. The additional interface 116 causes an additional reflected ultra-sonic signal 117 of the ultra-sonic pulse as the transmitted ultra-sonic signal 111. The additional reflected ultra-sonic signal 117 has a time of flight between the first time of flight of reflected signal 112 and the last time of flight of reflected signal 115.

The sensor circuit 107 may determine that the reflected ultra-sonic signal 117 is not the last reflected signal and disregard the reflection for the selection operation. Alternatively, sensor circuit 107 may calculate the time difference between the time of flights of signals 112 and 117 to determine the acoustic properties or the material of layer 102b, calculate the time difference between the time of flights of signals 117 and 115 to determine the acoustic properties or the material of layer 102a, and select an excitation signal and/or a touch detection algorithm for use in normal operation mode based on the two time of flight differences or the two determined materials.

The sensor circuit 107 may use a predefined lookup table (LUT), stored in memory, for selecting the excitation signal and/or a touch detection algorithm based on the time of flight analysis in configuration mode. The configuration mode and the excitation of an ultra-sonic pulse for determining the acoustic properties of the touch structure 102 is performed during a no touch condition at the touch surface 104. In this way, external influences are minimized and the calculation simplified.

As noted above, the sensor circuit 107 is configured to trigger the transmitter 105 via an excitation pulse to generate an ultra-sonic pulse, calculate the time difference ΔTOF between the first TOF and the last TOF, and select the excitation signal and/or a touch detection algorithm based on the calculated time difference ΔTOF. Alternatively, the sensor circuit 107 may use a plurality of excitation pulses over a plurality of excitation frames to calculate an average time difference ΔTOFavg between the first TOF and the last TOF over the plurality of excitation frames. In this, case, a single ultra-sonic pulse is generated for each excitation frame, the time difference ΔTOF between the first TOF and the last TOF for each excitation frame is calculated, and the time differences ΔTOFs are averaged to determine average time difference ΔTOFavg. The sensor circuit 107 is configured to select the excitation signal and/or a touch detection algorithm based on the calculated average time difference ΔTOFavg.

Below, three example lookup tables LUT1, LUT2, and LUT3 are provided that may be used by the sensor circuit 107 to select or configure the excitation signal and/or the touch detection algorithm to be used during normal operation mode. The sensor circuit 107 is configured to calculate ΔTOF or ΔTOFavg and find a corresponding ΔTOF (i.e., ΔTOF_x, ΔTOF_y, ΔTOF_z, ΔTOF_zx, . . . ) in one of the lookup tables. ΔTOF_x, ΔTOF_y, ΔTOF_z, and ΔTOF_zx in the table may be discrete time of flight values or ranges of discrete time of flight values and are mutually exclusive from each other. Meaning, the TOF values or ranges have no overlapping values. Upon matching the calculated ΔTOF or ΔTOFavg to the corresponding ΔTOF in the table, the sensor circuit 107 selectively configures the excitation signal and the touch detection algorithm accordingly.

For example, LUT1 provides different pairs of excitation signals and touch detection algorithm for each ΔTOF entry. In some cases, all excitation signals in the table may be different and all touch detection algorithms in the table may be different. In other cases, some rows may have a same excitation signal or a same touch detection algorithm. Any paired combination is conceivable. In any case, sensor circuit 107 selects the excitation signal and touch detection algorithm from the table that corresponds to the matched time of flight entry.

| LUT 1 | | |
|---|---|---|
| ΔTOF_x | Excitation_x | Algorithm_x |
| ΔTOF_y | Excitation_y | Algorithm_y |
| ΔTOF_z | Excitation_z | Algorithm_z |
| ΔTOF_zx | Excitation_z | Algorithm_x |
| . . . | . . . | . . . |

Alternatively, LUT2 provides different pairs of excitation signals and algorithm parameter sets for each ΔTOF entry. In this example, a configurable touch detection algorithm may be used but configured differently according to the different algorithm parameter sets algorithm parameter set_x, algorithm parameter set_y, and algorithm parameter set_z. Thus, each of the parameter sets is a set of one or more variables that are applied to the touch detection algorithm to formulate a configured touch detection algorithm to be used in normal operation mode. In other words, one configurable touch detection algorithm is adapted differently according to the selected algorithm parameter set. Additional ΔTOF entry, ΔTOF_xx, is included in LUT2 to demonstrate that different excitation signals (e.g., excitation_x and excitation_xx) may be paired with a same algorithm parameter set. Excitation signals excitation_x and excitation_xx may be similar in format (e.g., single pulse, pulse train, and/or chirp) but with different parameters (e.g., amplitude, frequency, number of pulses, pulse frequency, start/stop frequency, or bandwidth), but it not limited thereto.

| LUT2 | | | |
|---|---|---|---|
| ΔTOF_x | Excitation_x | Algorithm | Algorithm Parameter Set_x |
| ΔTOF_y | Excitation_y | Algorithm | Algorithm Parameter Set_y |
| ΔTOF_z | Excitation_z | Algorithm | Algorithm Parameter Set_z |
| ΔTOF_xx | Excitation_xx | Algorithm | Algorithm Parameter Set_x |
| . . . | . . . | . . . | . . . |

Alternatively, LUT3 provides different excitation parameter sets for each ΔTOF entry. In this case, the same touch detection algorithm may be used regardless of the calculated ΔTOF. Each of the parameter sets is a set of one or more variables that are applied to formulate a configured excitation signal to be used in normal operation mode. In other words, excitation signals excitation_x, excitation_y, and excitation_z are configurable by different excitation parameter sets x1, y, x2, and z. The configurable excitation signal is adapted differently according to the selected excitation parameter set, which may define any number of signal parameters including amplitude, frequency, number of pulses, pulse frequency, start/stop frequency, or bandwidth but are not limited thereto. ΔTOF entries ΔTOF_x1, ΔTOF_x2, ΔTOF_y, and ΔTOF_z are used to select corresponding excitation signal/parameter set pair based on the calculated ΔTOF or ΔTOFavg matched therewith.

| LUT3 | | |
|---|---|---|
| ΔTOF_x1 | Excitation_x | Excitation Parameter Set_x1 |
| ΔTOF_x2 | Excitation_x | Excitation Parameter Set_x2 |
| ΔTOF_y | Excitation_y | Excitation Parameter Set_y |
| ΔTOF_z | Excitation_z | Excitation Parameter Set_z |
| . . . | . . . | . . . |

In some cases, the package height h is known. Thus, the first time of flight (i.e., of the first reflected signal 112, which depends on the package height h is also known (i.e., predetermined). On the other hand, the last time of flight of the last reflected signal 115 always depends on the touch material acoustic properties of the touch structure 102, the full thickness of the touch structure 102, etc. If the thickness of the touch structure 102 is known, the sensor circuit 107 can determine the sound velocity through the touch structure 102 according to Equation 1.

$$TOF\_last = TOF\_first + 2 * thickness/sound\ velocity \qquad \text{Eq. 1,}$$

where TOF_first is the time of flight of the first reflected signal, which may be known based on the package height h, and TOF_last is the time of flight of the last reflected signal 115. By determining the sound velocity, the sensor circuit 107 can select the excitation signal and/or the touch detection algorithm based on a lookup table that has different excitation signal and/or the touch detection algorithm configurations mapped to different sound velocities or different sound velocity ranges.

Lookup table LUT4 provides another example of selectively configuring an excitation signal when TOF_first and the thickness of the touch structure 102 are known. The sensor circuit 107 may receive the thickness value of the touch structure 102 via user input to determine which LUT to refer to or which range of LUT entries to refer to. In this case, only TOF_last or an average thereof (e.g., TOF_last_avg) acquired by averaging multiple measurements of TOF_last over multiple excitation frames needs to be determined by the sensor circuit 107 to match the measured TOF to a corresponding TOF entry in the table. TOF_last_x, TOF_last_xx, TOF_last_y, and TOF_last_z are TOF entries that correspond to different, mutually exclusive TOF values or TOF ranges. Similar in use to LUT3, the sensor circuit 107 is configured to select or configure the excitation signal to be used during normal operation mode based on a lookup operation using the measured TOF_last or TOF_last_avg and the TOF entries in the table. This concept can be similarly extended to other lookup tables, including LUT1 and LUT2.

| LUT4 | | |
|---|---|---|
| TOF_last_x | Excitation_x | Excitation Parameter Set_x1 |
| TOF_last_xx | Excitation_x | Excitation Parameter Set_x2 |
| TOF_last_y | Excitation_y | Excitation Parameter Set_y |
| TOF_last_z | Excitation_z | Excitation Parameter Set_z |
| ... | ... | ... |

Figure 2:
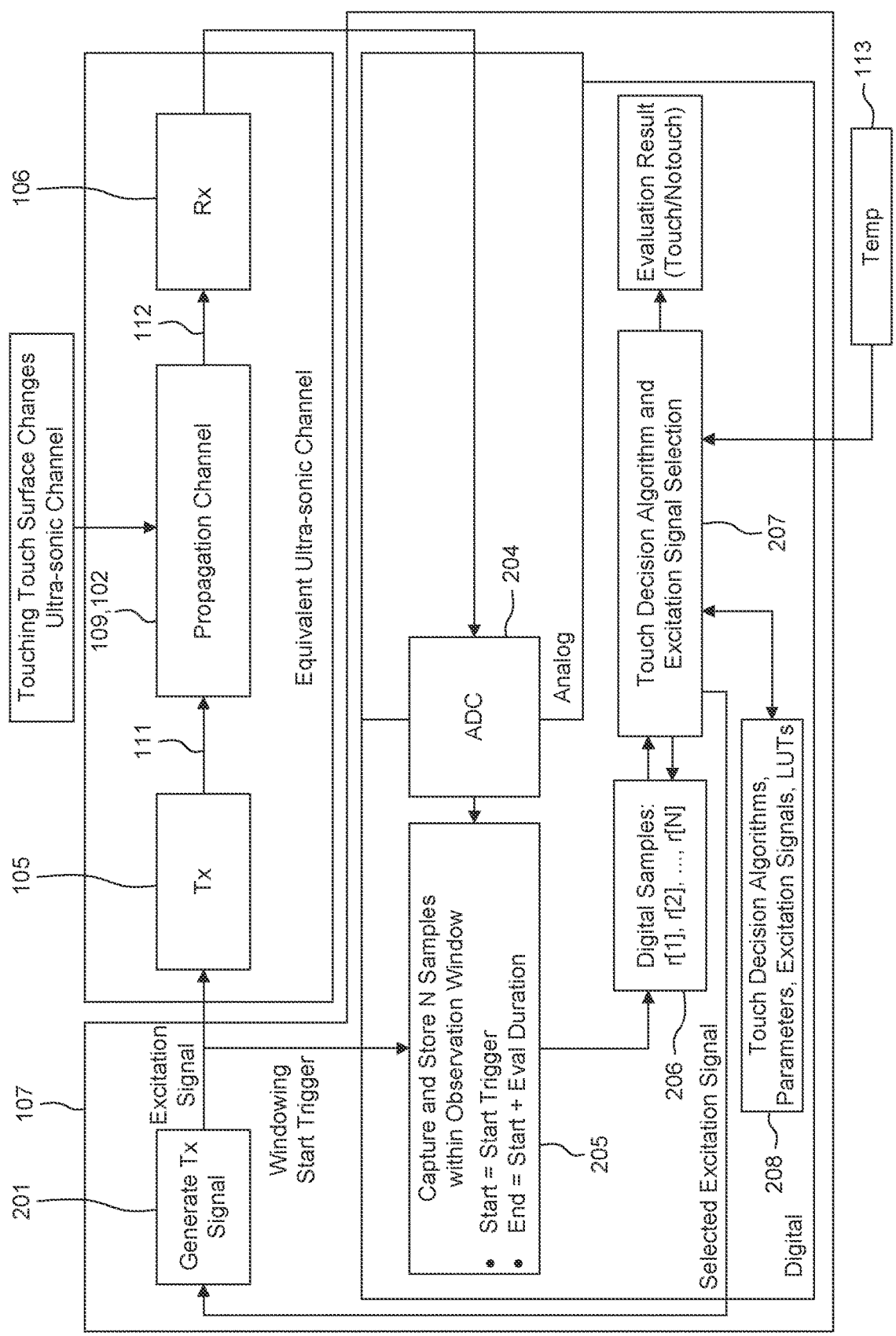
FIG. 2 illustrates a schematic block diagram of an ultra-sonic touch sensor according to one or more embodiments.

FIG. 2 illustrates a schematic block diagram of the ultra-sonic touch sensors 100A, 100B, 100C according to one or more embodiments. The ultra-sonic touch sensors 100A, 100B, 100C are schematically equivalent and include the sensor circuit 107 comprising both analog and digital domains, the transmitter 105, the propagation channel comprising both the coupling medium 109 and the touch structure 102, including the interfaces 110 and 114, and the receiver 106. Together, the transmitter 105, the propagation channel, and the receiver 106 make up the equivalent ultra-sonic channel of an ultra-sonic signal. A touching of the touch surface 104 (i.e., a touch event) changes a property of the ultra-sonic channel and, more particularly, a property of the propagation channel.

The sensor circuit 107 includes a signal generator 201 that generates an excitation signal (e.g., a signal square pulse in configuration mode) and transmits the excitation signal to the transmitter 105, which in turn generates the ultra-sonic transmit signal for transmission along the propagation channel based on the excitation signal. The receiver 106 receives the ultra-sonic transmit signal 111 as a reflected ultra-sonic signal 112 (i.e., a first echo) and a reflected ultra-sonic signal 115 (i.e., a last echo). The receiver 106 transmits the received signals to the processing circuitry of the sensor circuit 107 for analysis.

It is noted that the signal generator 201 is configurable such that, in normal operation mode, it will generate an excitation signal selected and programmed by the sensor circuit 107 during configuration mode.

The processing circuit of the sensor circuit 107 includes a multi-bit ADC 204 that converts the analog signal into a multi-bit digital code or digital value according to a sampling rate The ADC 204 acquires a number of digital samples N from the reflected ultra-sonic signals 112 and 115 (in accordance with its sampling rate and sequentially outputs the digital samples to a memory 206 (e.g., Random-Access Memory (RAM), registers, flip flops, etc.).

The processing circuit of the sensor circuit 107 may include a capture and store circuit 205 that determines which digital samples are captured and stored in memory 206 depending on whether the digital samples are received during an observation window. The capture and store circuit 205 may include at least one processor or may be part of a processor that determines an observation window and forwards digital samples received within the observation window to the memory 206. Essentially, the capture and store circuit 205 filters out digital samples that are received from the ADC 204 that are outside an observation window and forwards only those digital samples to memory 206 that are received during the observation window. The observation window is configured such that the first and last reflected signals 112 and 115 are detected.

In this example, the number of digital samples to be captured during the observation window may be N samples. The start time of the observation window is triggered by the start of the excitation signal and may set to a predetermined (fixed) evaluation duration that is adequate for the last reflection to be received by the receiver 106. If a digital sample is received by the capture and store circuit 205 during the observation window, the capture and store circuit 205 transmits the digital sample to memory 206. Otherwise, the capture and store circuit 205 may discard the digital sample as not relevant. Here, the memory 206 receives and stores N samples, r[1], r[2], . . . , r[N].

The processing circuit of the sensor circuit 107 further includes evaluation processing circuit 207, such as one or more, that receives the N samples from memory 206 and uses a peak detector to detect peaks that are indicative of different reflected signals (echoes). In this way, the timing at which reflected signals 112 and 115 are received can be detected. For example, using a single pulse excitation (as in configuration mode) will cause the peaks (echoes) corresponding to each TOF to be clearly separated in time and with amplitudes considerably higher than the noise or clutter level. Thus, the evaluation processing circuit 207 monitors for peaks above a (e.g., noise) threshold and determines a time of a detected peak relative to the time the excitation signal was triggered to determine the corresponding time of flight. Peaks of different reflected signals (echoes) will be separated in the time domain by dips in the amplitude that fall below the threshold. Thus, the peak detector can clearly distinguish one echo from a subsequent echo by evaluating the amplitudes of the digital samples.

Once the first and last reflected signals 112 and 115 are detected and their time of flights determined, the evaluation processing circuit 207 is configured to refer to a lookup table to selectively configure the excitation signal and/or the touch detection algorithm. An additional memory 208 may store the lookup table, different excitation signals, different touch decision algorithms, and/or parameters thereof used to selectively configure the excitation signal and/or the touch detection algorithm. Once selected, the evaluation processing circuit 207 can configure the signal generator with the selected excitation signal or parameters thereof for use in normal operation mode. Similarly, the evaluation processing circuit 207 is configured to use the selected touch detection algorithm or parameters thereof in normal operation mode for detecting touch and no touch events. In normal operation mode, the evaluation processing circuit 207 outputs touch and no touch evaluation results.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Furthermore, the description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid in the understanding of the principles of the disclosure and the concepts contributed to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof. Thus, it is understood that modifications and variations of the arrangements and the details described herein will be apparent to others skilled in the art.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

What is claimed is:

1. A touch sensor, comprising:
a housing having a recess;
a touch structure coupled to the housing and arranged over the recess such that the recess forms an enclosed interior volume, wherein the touch structure comprises a touch surface and an inner surface arranged opposite to the touch surface, wherein the inner surface faces towards the enclosed interior volume and forms a first interface between the touch structure and the enclosed interior volume, and wherein the touch surface forms a second interface between the touch structure and an external environment;
a signal generator configured to generate a first excitation signal during a configuration mode and generate a second excitation signal during a touch detection operation mode;
a transmitter arranged inside the enclosed interior volume, wherein the transmitter is configured to generate an ultra-sonic test signal based on the first excitation signal and an ultra-sonic touch evaluation signal based on second excitation signal;
a receiver arranged inside the enclosed interior volume and coupled to the transmitter via a propagation path, wherein the receiver is configured to receive a plurality of ultra-sonic reflected signals produced from the ultra-sonic test signal and the propagation path, including a first ultra-sonic reflected signal internally reflected by the first interface and a last ultra-sonic reflected signal internally reflected by the second interface; and
a sensor circuit arranged inside the enclosed interior volume and configured to determine a last time of flight corresponding to the last ultra-sonic reflected signal and selectively configure the second excitation signal based on the last time of flight.

2. The touch sensor of claim 1, wherein the receiver is configured to provide a measurement signal to the sensor circuit based on the plurality of ultra-sonic reflected signals, and the sensor circuit is configured to monitor the measurement signal for signal peaks associated with the plurality of ultra-sonic reflected signals for determining the last time of flight corresponding to the last ultra-sonic reflected signal.

3. The touch sensor of claim 2, wherein the sensor circuit is configured to monitor the measurement signal for the signal peaks for a predetermined observation window following the first excitation signal.

4. The touch sensor of claim 1, further comprising:
a memory configured to store a plurality of selectable excitation signal configurations, and
the sensor circuit is configured to select a selectable excitation signal configuration from among the plurality of selectable excitation signal configurations to be used by the signal generator for generating the second excitation signal based on the last time of flight.

5. The touch sensor of claim 4, wherein each selectable excitation signal configuration has at least one signal parameter that is different from the other selectable excitation signal configurations.

6. The touch sensor of claim 4, wherein:
each of the plurality of selectable excitation signal configurations is associated with at least one time of flight range of a plurality of time of flight ranges that are mutually exclusive from each other, and
the sensor circuit is configured to select the selectable excitation signal configuration from among the plurality of selectable excitation signal configurations that is associated with a time of flight range comprising the last time of flight.

7. The touch sensor of claim 1, further comprising:
a memory configured to store a plurality of selectable excitation signal parameter sets, and
the sensor circuit is configured to select one of the plurality of selectable excitation signal configurations for configuring the second excitation signal based on the last time of flight.

8. The touch sensor of claim 7, wherein each selectable excitation signal parameter set has at least one parameter that is different from the other selectable excitation signal parameter sets.

9. The touch sensor of claim 1, wherein:
while operating in the touch detection operation mode, the sensor circuit is configured to use a touch detection algorithm to determine whether a no-touch event or a touch event has occurred at the touch surface, and
while operating in the configuration mode, the sensor circuit is configured to selectively configure the touch detection algorithm based on the last time of flight.

10. The touch sensor of claim 9, further comprising:
a memory configured to store a plurality of selectable touch detection algorithms, and
the sensor circuit is configured to select a selectable touch detection algorithm from among the plurality of touch detection algorithms to be used as the touch detection algorithm based on the last time of flight.

11. The touch sensor of claim 1, wherein the sensor circuit is configured to determine a first time of flight corresponding to the first ultra-sonic reflected signal and selectively configure the second excitation signal based on the first time of flight and the last time of flight.

12. The touch sensor of claim 11, wherein the receiver is configured to provide a measurement signal to the sensor circuit based on the plurality of ultra-sonic reflected signals, and the sensor circuit is configured to monitor the measurement signal for signal peaks associated with the plurality of ultra-sonic reflected signals for determining the first time of flight corresponding to the first ultra-sonic reflected signal and the last time of flight corresponding to the last ultra-sonic reflected signal.

13. The touch sensor of claim 11, wherein the sensor circuit is configured to determine a time difference between the first time of flight and the last time of flight, and selectively configure the second excitation signal based on the time difference.

14. The touch sensor of claim 13, further comprising:
a memory configured to store a plurality of selectable excitation signal configurations, and
the sensor circuit is configured to select a selectable excitation signal configuration from among the plurality of selectable excitation signal configurations to be used as the second excitation signal based on the time difference.

15. The touch sensor of claim 14, wherein:
each of the plurality of selectable excitation signal configurations is associated with at least one time difference range of a plurality of time difference ranges that are mutually exclusive from each other, and
the sensor circuit is configured to select the selectable excitation signal configuration from among the plurality of selectable excitation signal configurations that is associated with a time difference range comprising the time difference.

16. The touch sensor of claim 13, wherein:
while operating in the touch detection operation mode, the sensor circuit is configured to use a touch detection algorithm to determine whether a no-touch event or a touch event has occurred at the touch surface, and
while operating in the configuration mode, the sensor circuit is configured to selectively configure the touch detection algorithm based on the time difference.

17. The touch sensor of claim 1, wherein the sensor circuit is configured to receive a thickness value of the touch structure, and selectively configure the second excitation signal based on the last time of flight and the thickness value.

18. The touch sensor of claim 1, wherein the first excitation signal is a single signal pulse.

19. A touch sensor, comprising:
a housing having a recess;
a touch structure coupled to the housing and arranged over the recess such that the recess forms an enclosed interior volume, wherein the touch structure comprises a touch surface and an inner surface arranged opposite to the touch surface, wherein the inner surface faces towards the enclosed interior volume and forms a first interface between the touch structure and the enclosed interior volume, and wherein the touch surface forms a second interface between the touch structure and an external environment;
a signal generator configured to generate a first excitation signal during a configuration mode and generate a second excitation signal during a touch detection operation mode;
a transmitter arranged inside the enclosed interior volume, wherein the transmitter is configured to generate an ultra-sonic test signal based on the first excitation signal and an ultra-sonic touch evaluation signal based on second excitation signal;
a receiver arranged inside the enclosed interior volume and coupled to the transmitter via the touch structure, wherein the receiver is configured to receive a plurality of ultra-sonic reflected signals produced from the ultra-sonic test signal and the touch structure, including a first ultra-sonic reflected signal internally reflected by the first interface and a last ultra-sonic reflected signal internally reflected by the second interface; and
a sensor circuit arranged inside the enclosed interior volume,
wherein while operating in the touch detection operation mode, the sensor circuit is configured to use a touch detection algorithm to determine whether a no-touch event or a touch event has occurred at the touch surface, and
wherein while operating in the configuration mode, the sensor circuit is configured to determine a last time of flight corresponding to the last ultra-sonic reflected signal and selectively configure the touch detection algorithm based on the last time of flight.

20. A method of configuring a touch sensor, the method comprising:
transmitting an ultra-sonic test signal induced by a first excitation signal towards a touch structure that has a first interface with an enclosed interior volume of the touch sensor and a second interface with an external environment;
receiving a plurality of ultra-sonic reflected signals produced from the ultra-sonic test signal and the touch structure, including a first ultra-sonic reflected signal internally reflected by the first interface and a last ultra-sonic reflected signal internally reflected by the second interface;
determining a last time of flight corresponding to the last ultra-sonic reflected signal; and selectively configuring a second excitation signal based on the last time of flight, wherein the second excitation signal is used for inducing further ultra-sonic signals.

21. The method of claim 20, further comprising:

transmitting an ultra-sonic touch evaluation signal based on second excitation signal; and determining whether a no-touch event or a touch event has occurred at the touch structure based on at least one additional ultra-sonic reflected signal produced from the ultra-sonic touch evaluation signal via internal reflection at the touch structure.

22. The method of claim 20, further comprising:

generating a measurement signal based on the plurality of ultra-sonic reflected signals; and monitoring the measurement signal for signal peaks associated with the plurality of ultra-sonic reflected signals for determining the last time of flight corresponding to the last ultra-sonic reflected signal.

23. The method of claim 20, further comprising:

based on the last time of flight, selecting a selectable excitation signal configuration from among a plurality of selectable excitation signal configurations to be used for generating the second excitation signal.

24. The method of claim 20, wherein:

while operating in the touch detection operation mode, using a touch detection algorithm to determine whether a no-touch event or a touch event has occurred at the touch substrate; and while operating in a configuration mode, selectively configuring the touch detection algorithm based on the last time of flight.

* * * * *

UNITED STATES PATENT AND TRADEMARK OFFICE
CERTIFICATE OF CORRECTION

| | | |
|---|---|---|
| PATENT NO. | : 11,520,439 B1 | Page 1 of 1 |
| APPLICATION NO. | : 17/487325 | |
| DATED | : December 6, 2022 | |
| INVENTOR(S) | : Lavinia-Elena Ciotirca et al. | |

It is certified that error appears in the above-identified patent and that said Letters Patent is hereby corrected as shown below:

In the Claims

In Claim 24, Column 19, Line 25, "while operating in the touch" should be changed to -- while operating in a touch --.

In Claim 24, Column 19, Line 28, "touch substrate; and" should be changed to -- touch structure; and --.

Signed and Sealed this
Twenty-fourth Day of January, 2023

Katherine Kelly Vidal
*Director of the United States Patent and Trademark Office*